(12) United States Patent
Pope et al.

(10) Patent No.: US 10,349,483 B2
(45) Date of Patent: Jul. 9, 2019

(54) AMBIENT LIGHT SENSOR CIRCUIT

(71) Applicant: Cree, Inc., Durham, NC (US)

(72) Inventors: Daniel J. Pope, Morrisville, NC (US); Joseph P. Chobot, Morrisville, NC (US)

(73) Assignee: Cree, Inc., Durham, NC (US)

(*) Notice: Subject to any disclaimer, the term of this patent is extended or adjusted under 35 U.S.C. 154(b) by 178 days.

(21) Appl. No.: 14/928,249

(22) Filed: Oct. 30, 2015

(65) Prior Publication Data
US 2017/0127491 A1 May 4, 2017

(51) Int. Cl.
*H05B 33/08* (2006.01)
*H05B 37/02* (2006.01)
*G01J 1/44* (2006.01)
*G01J 1/42* (2006.01)

(52) U.S. Cl.
CPC ........ *H05B 33/0854* (2013.01); *G01J 1/4204* (2013.01); *G01J 1/44* (2013.01); *H05B 37/0218* (2013.01); *Y02B 20/46* (2013.01)

(58) Field of Classification Search
CPC ............... H05B 37/0218; G01J 1/44; G01J 2001/4406–4493
See application file for complete search history.

(56) References Cited

U.S. PATENT DOCUMENTS

| 9,155,166 | B2 | 10/2015 | Chobot | |
| 2004/0036012 | A1* | 2/2004 | Horiguchi | G01J 1/44 250/214 R |
| 2009/0312987 | A1* | 12/2009 | Uedaira | G01J 1/18 702/189 |
| 2014/0167653 | A1 | 6/2014 | Chobot | |
| 2014/0191114 | A1* | 7/2014 | Russo | G01S 17/08 250/208.2 |
| 2014/0268790 | A1 | 9/2014 | Chobot et al. | |

(Continued)

OTHER PUBLICATIONS

Author Unknown, "Ambient Light Sensor ICs: Analog Current Output Type Ambient Light Sensor IC," Technical Note, BH1620FVC, No. 12046EDT03, Revision D, Feb. 2012, ROHM Co., Ltd., 11 pages.

(Continued)

*Primary Examiner* — Seokjin Kim
(74) *Attorney, Agent, or Firm* — Withrow & Terranova, P.L.L.C.

(57) ABSTRACT

Ambient light sensor circuitry includes a photodetector, a controllable current source, and control circuitry. The photodetector is coupled between a supply voltage and an intermediate node and configured to provide a photodetector current proportional to an amount of light detected thereby to the intermediate node. The controllable current source is coupled between the intermediate node and ground and configured to shunt a portion of the photodetector current from the intermediate node to ground based on a current control signal. The control circuitry is coupled to the intermediate node and the controllable current source and configured to provide the current control signal to the controllable current source, receive a measurement signal from the intermediate node, adjust the current control signal such that the measurement signal does not exceed a maximum input threshold of the control circuitry, and provide an ambient light measurement signal based on the current control signal.

16 Claims, 7 Drawing Sheets

(56) References Cited

U.S. PATENT DOCUMENTS

2015/0287841 A1* 10/2015 Margulis .......... H01L 31/02027
250/214.1
2015/0373808 A1* 12/2015 Kuo .................. H05B 37/0218
315/158

OTHER PUBLICATIONS

Author Unknown, "Ambient Light Sensor ICs: Analog Current Output Type Ambient Light Sensor IC," Technical Note, BH1680FVC, No. 12046EBT14, Revision B, Feb. 2012, ROHM Co., Ltd, 11 pages.

* cited by examiner

AMBIENT LIGHT SENSOR CIRCUIT

FIELD OF THE DISCLOSURE

The present disclosure relates to ambient light sensor circuitry, and specifically to ambient light sensor circuitry for use in lighting fixtures.

BACKGROUND

Ambient light sensors are used in a variety of applications and devices. For example, ambient light sensors have been provided in lighting fixtures and used to measure an ambient light level of the surrounding environment. The lighting fixtures may use the information about the ambient light level of the surrounding environment to adjust one or more characteristics of the light output thereof. Generally, ambient light sensors include a photodetector of some kind and supporting circuitry for converting measurements from the photodetector into one or more desired signals. FIG. 1 shows conventional ambient light sensor circuitry 10. The conventional ambient light sensor circuitry 10 includes a photodetector 12 coupled in series with a measurement resistor 14 between a supply voltage VCC and ground. Generally, the photodetector 12 is a photodiode and current amplifier that are provided together in a single package. The photodetector 12 includes an input coupled to the supply voltage VCC and an output coupled to an intermediate node 16, and the measurement resistor 14 is coupled between the intermediate node 16 and ground. Control circuitry 18 is coupled to the intermediate node 16 and includes an output 20 for providing an ambient light measurement signal ALMS.

In operation, the photodetector 12 provides a photodetector current I_PD in proportion to the amount of light provided to the photodetector 12. The photodetector current I_PD is provided across the measurement resistor 14, which generates a measurement voltage V_MS at the intermediate node 16. The control circuitry 18 receives the measurement voltage V_MS and performs an analog-to-digital conversion thereon to generate a digital value representative of the measurement voltage V_MS. The digital value is then used to provide the ambient light measurement signal ALMS in a desired format.

Two important performance characteristics of ambient light sensor circuitry are resolution and range. Resolution defines the smallest change in light that is detectable by the ambient light sensor circuitry. Range defines the difference between the smallest light measurement and the largest light measurement that the ambient light sensor circuitry is capable of differentiating between. The size of the measurement resistor 14 and the input voltage range of the control circuitry 18 determine the resolution and range of the conventional ambient light sensor circuitry 10. Due to the limitations of the conventional ambient light sensor circuitry 10, increasing the resolution of the circuitry necessarily decreases the range thereof, and vice-versa.

For example, using a relatively large measurement resistor 14 will allow the conventional ambient light sensor circuitry 10 to differentiate between relatively small changes in light (e.g., 10 foot-candles, 50 foot-candles, etc.), however, the range of the conventional ambient light sensor circuitry 10 will be limited (e.g., 80 foot-candles for a 10 foot-candle resolution and 400 foot-candles for a 50 foot-candle resolution) since the measurement voltage V_MS will quickly reach the maximum input voltage of the control circuitry 18, thereby clipping any measurements that are above the maximum input voltage. The limited range of the conventional ambient light sensor circuitry 10 caused by clipping means that each bit in the digital value used to describe the measurement voltage V_MS after analog-to-digital conversion within the control circuitry 18 defines a more granular light measurement, resulting in a higher resolution. If a relatively small measurement resistor 14 is used, the measurement voltage V_MS is no longer clipped by the maximum input voltage of the control circuitry 18 such that the range of the conventional ambient light sensor circuitry 10 is increased (at the expense of resolution). In other words, while the difference in light described by the smallest digital value used to describe the measurement voltage V_MS after analog-to-digital conversion within the ambient light sensor microcontroller and the largest digital value describing the same may be very large (e.g., 10,000 foot-candles), the resolution is limited to the range divided by the number of bits of the digital value (e.g., 10,000 foot-candles/8 bits=1,250 foot-candles/1 bit).

In many indoor applications, the limited range of the conventional ambient light sensor circuitry 10 is not problematic, due to the fact that indoor light is only provided over a limited range. Accordingly, resolution can be favored over range in indoor applications while losing little to no data. In outdoor applications, range must be favored over resolution to avoid data loss. This may be problematic in applications demanding a high range and resolution. Accordingly, there is a need for improved ambient light sensor circuitry.

SUMMARY

The present disclosure relates to ambient light sensor circuitry, and specifically to ambient light sensor circuitry for use in lighting fixtures. In one embodiment, ambient light sensor circuitry includes a photodetector, a controllable current source, and control circuitry. The photodetector is coupled between a supply voltage and an intermediate node, and is configured to provide a photodetector current proportional to an amount of light detected thereby to the intermediate node. The controllable current source is coupled between the intermediate node and ground and configured to shunt a portion of the photodetector current from the intermediate node to ground based on a current control signal. The control circuitry is coupled to the intermediate node and the controllable current source, and is configured to provide the current control signal to the controllable current source, receive a measurement signal from the intermediate node, adjust the current control signal such that the measurement signal does not exceed a maximum input threshold of the control circuitry, and provide an ambient light measurement signal based at least in part on the current control signal. By using the controllable current source and providing the ambient light measurement signal based at least in part on the current control signal, the ambient light sensor circuitry can achieve both high resolution and range.

In one embodiment, a lighting fixture includes a solid-state light source, driver circuitry, and ambient light sensor circuitry. The solid-state light source is configured to provide a light output based on a driver signal. The driver circuitry is configured to provide the driver signal to the solid-state light source based at least in part on an ambient light measurement signal. The ambient light sensor circuitry includes a photodetector, a controllable current source, and control circuitry. The photodetector is coupled between a supply voltage and an intermediate node, and is configured to provide a photodetector current proportional to an amount of light detected thereby to the intermediate node. The controllable current source is coupled between the intermediate node and ground and configured to shunt a portion of the photodetector current from the intermediate node to ground based on a current control signal. The control circuitry is coupled to the intermediate node and the controllable current source, and is configured to provide the current control signal to the controllable current source, receive a measurement signal from the intermediate node, adjust the current control signal such that the measurement signal does not exceed a maximum input threshold of the control circuitry, and provide the ambient light measurement signal to the driver circuitry based at least in part on the current control signal. By using the controllable current source and providing the ambient light measurement signal based at least in part on the current control signal, the ambient light sensor circuitry can achieve both high resolution and range.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
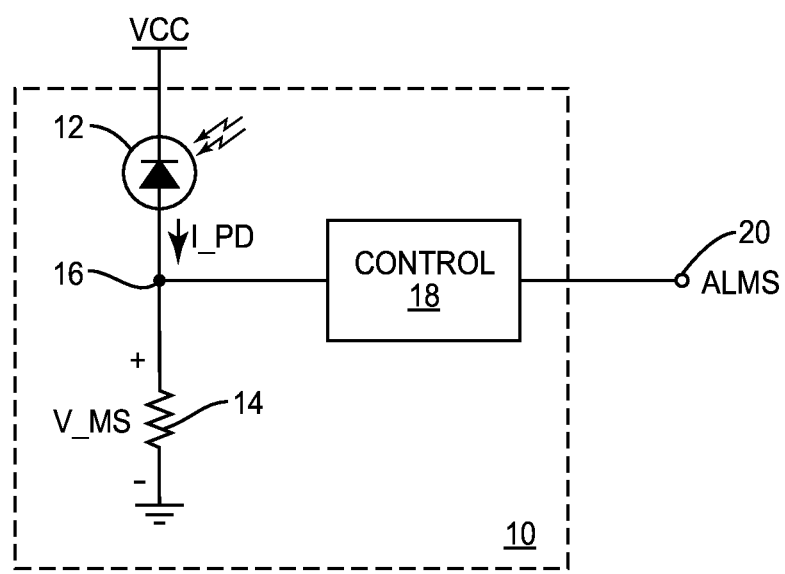
FIG. 1 is a functional schematic of conventional ambient light sensor circuitry.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
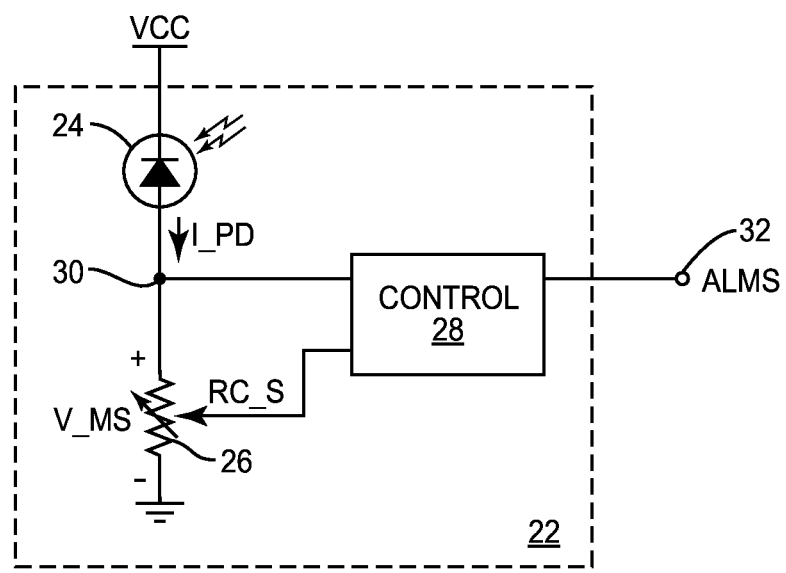
FIG. 2 is a functional schematic of ambient light sensor circuitry according to one embodiment of the present disclosure.

FIG. 2 shows ambient light sensor circuitry 22 according to one embodiment of the present disclosure. The ambient light sensor circuitry 22 includes a photodetector 24, an adjustable measurement resistor 26, and control circuitry 28. The photodetector 24 is coupled between a supply voltage VCC and an intermediate node 30. The photodetector 24 may be a photodiode and amplifier package including an input coupled to the supply voltage VCC and an output coupled to the intermediate node 30, however, any suitable components may be used for the photodetector 24 without departing from the principles of the present disclosure. The adjustable measurement resistor 26 is coupled between the intermediate node 30 and ground. The control circuitry 28 is coupled to the intermediate node 30 and the adjustable measurement resistor 26. Further, the control circuitry 28 includes an output 32 for providing an ambient light measurement signal ALMS.

In operation, the photodetector 24 provides a photodetector current I_PD in proportion to the amount of light provided by the photodetector 24. The photodetector current I_PD is provided across the adjustable measurement resistor 26, which generates a measurement voltage V_MS at the intermediate node 30. The control circuitry 28 receives the measurement voltage V_MS and performs an analog-to-digital conversion thereon to generate a digital value representative of the measurement voltage V_MS. The digital value is then used to provide the ambient light measurement signal ALMS in a desired format.

As discussed above, setting the value of the adjustable measurement resistor 26 high will result in increased resolution and reduced range of the ambient light sensor circuitry 22. The value of the adjustable measurement resistor 26 may therefore initially be set high in order to provide increased resolution. As the photodetector current I_PD increases such that the measurement voltage V_MS becomes larger than the maximum input voltage of the control circuitry 28 (e.g., when the digital value becomes all 1's), the control circuitry 28 adjusts the adjustable measurement resistor 26 via a resistor control signal RC_S to increase the range thereof. In one embodiment, the control circuitry 28 adjusts the adjustable measurement resistor 26 to the minimum possible amount, such that the value of the adjustable measurement resistor 26 is lowered until the least significant bit of the digital value is set to zero (e.g., for an 8-bit digital value, the adjustable measurement resistor 26 is adjusted until the digital value changes from 11111111 to 11111110). In another embodiment, the control circuitry 28 adjusts the adjustable measurement resistor 26 such that the digital value is set to half of the maximum value thereof (e.g., for an 8-bit digital value, the adjustable measurement resistor 26 is adjusted until the digital value changes from 11111111 to 10000000). This can also be described as adjusting the adjustable measurement resistor 26 until all bits except the most significant bit of the digital value are set to zero. As the value of the resistor control signal RC_S is changed to adjust the value of the adjustable measurement resistor 26, the control circuitry 28 takes this into account in providing the ambient light measurement signal ALMS. That is, the ambient light measurement signal ALMS is adjusted based at least in part on the resistor control signal RC_S in order to compensate for the fact that the range of the circuitry has been increased. In general, the adjustment to the ambient light measurement signal ALMS is inversely proportional to the value of the adjustable measurement resistor 26. The particular relationship between the ambient light measurement signal ALMS, the value of the adjustable measurement resistor 26, the resistor control signal RC_S, and the amount of light detected by the photodetector 24 may be determined by calculation and/or experimentation and stored in a look-up table or otherwise in the control circuitry 28 such that the ambient light measurement signal ALMS accurately describes the amount of light detected by the photodetector 24.

While reducing the value of the adjustable measurement resistor 26 allows for the range of the ambient light sensor circuitry 22 to be increased, doing so comes at the cost of resolution for the reasons described above. Accordingly, the granularity of the ambient light measurement signal ALMS will be very coarse when the value of the adjustable measurement resistor 26 is high.

Figure 3:
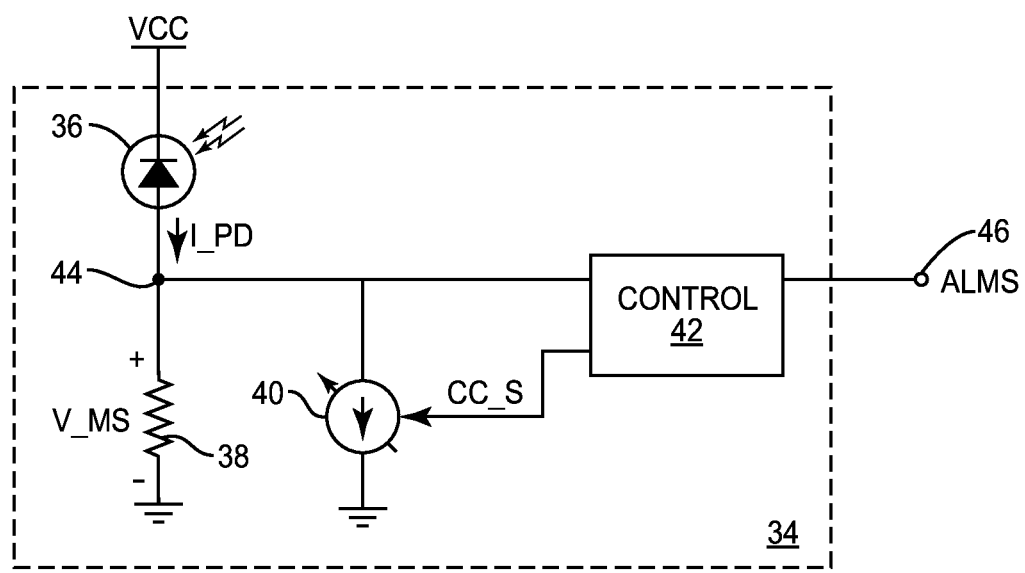
FIG. 3 is a functional schematic of ambient light sensor circuitry according to one embodiment of the present disclosure.

FIG. 3 thus shows ambient light sensor circuitry 34 according to an additional embodiment of the present disclosure. The ambient light sensor circuitry 34 includes a photodetector 36, an optional measurement resistor 38, a controllable current source 40, and control circuitry 42. The photodetector 36 is coupled between a supply voltage VCC and an intermediate node 44. The photodetector 36 may be a photodiode and amplifier including an input coupled to the supply voltage VCC and an output coupled to the intermediate node 44, however, any suitable components may be used for the photodetector 36 without departing from the principles of the present disclosure. The optional measurement resistor 38 is coupled between the intermediate node 44 and ground. The controllable current source 40 is also coupled between the intermediate node 44 and ground, such that when the optional measurement resistor 38 is provided, the controllable current source 40 is coupled in parallel with the optional measurement resistor 38 between the intermediate node 44 and ground. The control circuitry 42 is coupled to the intermediate node 44 and the controllable current source 40. Further, the control circuitry 42 includes an output 46 for providing an ambient light measurement signal ALMS.

In operation, the photodetector 36 provides a photodetector current I_PD in proportion to the amount of light provided by the photodetector 36. The photodetector current I_PD is provided across the adjustable measurement resistor 26, which generates a measurement voltage V_MS at the intermediate node 44. The control circuitry 42 receives the measurement voltage V_MS and performs an analog-to-digital conversion thereon to generate a digital value representative of the measurement voltage V_MS. The digital value is then used to provide the ambient light measurement signal ALMS in a desired format.

The value of the optional measurement resistor 38 is determined based on a desired resolution for the ambient light sensor circuitry 34. In general, the value of the optional measurement resistor 38 may be determined using Equation (1):

$$\frac{V_{IN(MAX)}}{R_{MS}} * LTC_{ALS} + R_{DES} \qquad (1)$$

where $V_{IN(MAX)}$ is the maximum input voltage of the control circuitry 42, $R_{MS}$ is the value of the optional measurement resistor 38, $LTC_{ALS}$ is the light-transfer characteristic of the photodetector 36 in foot-candles per Ampere, and $R_{DES}$ is the desired resolution of the ambient light sensor circuitry 34 in foot-candles. By solving for $R_{MS}$ in Equation (1), a desired resolution for the ambient light sensor circuitry 34 may be achieved.

Generally, the desired resolution $R_{DES}$ for the ambient light sensor circuitry 34 will limit the achievable range thereof. Accordingly, the controllable current source 40 is configured to shunt a portion of the photodetector current I_PD to ground based on a current control signal CC_S provided from the control circuitry 42. In particular, the control circuitry 42 continuously measures the measurement voltage V_MS at the intermediate node 44 and adjusts the current control signal CC_S to shunt a portion of the photodetector current I_PD to avoid clipping of the measurement voltage V_MS. Initially, the current control signal CC_S is provided such that the current control signal CC_S does not shunt any portion of the photodetector current I_PD to ground. As the photodetector current I_PD increases such that the measurement voltage V_MS becomes larger than the maximum input voltage of the control circuitry 42 (e.g., when the digital value becomes all 1's), the control circuitry 42 adjusts the current control signal CC_S to increase the portion of the photodetector current I_PD shunted to ground by the controllable current source 40. This effectively shifts the detection window of the ambient light sensor circuitry 34 without changing the resolution. That is, the floor and ceiling of the range change without changing the range itself (e.g., a photodetector current I_PD of zero and thus a measurement voltage V_MS of zero may indicate an ambient light level of 1000 foot-candles rather than 0 foot-candles depending on how much of the photodetector current I_PD is shunted to ground by the controllable current source 40). The current control signal CC_S is indicative of the amount of shift in the floor and ceiling of the range, and therefore is used by the control circuitry 42 as an offset to the measurement voltage V_MS to provide the ambient light measurement signal ALMS. The larger the amount of photodetector current I_PD shunted to ground by the controllable current source 40, the larger the offset, such that the ambient light measurement signal ALMS is proportional to the amount of photodetector current I_PD shunted to ground. The particular relationship between the amount of photodetector current I_PD shunted to ground by the controllable current source 40, the current control signal CC_S, the ambient light measurement signal ALMS, and the amount of light detected by the photodetector 36 may be determined by calculation and/or experimentation and stored in a look-up table or otherwise in the control circuitry 42 such that the ambient light measurement signal ALMS accurately describes the amount of light detected by the photodetector 36. As the photodetector current I_PD becomes smaller than the minimum input voltage of the control circuitry 42 (e.g., when the digital value becomes all 0's), the current control signal CC_S may be adjusted in the opposite direction to reduce the amount of the photodetector current I_PD shunted to ground by the controllable current source 40 and thus move the detection floor down.

Figure 4:
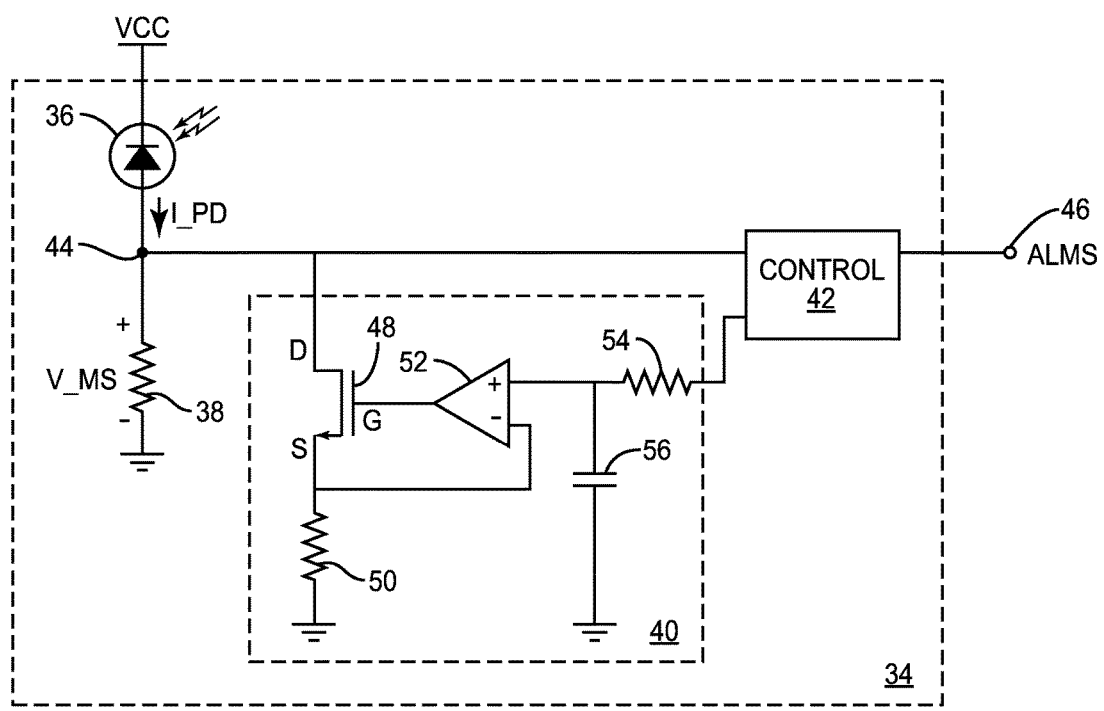
FIG. 4 is a functional schematic of ambient light sensor circuitry according to one embodiment of the present disclosure.

FIG. 4 shows details of the controllable current source 40 according to one embodiment of the present disclosure. The ambient light sensor circuitry 34 is shown for context. The controllable current source 40 includes a transistor 48 coupled in series with a shunt resistor 50 between the intermediate node 44 and ground, and an operational amplifier 52 coupled to the transistor 48. While the transistor 48 may be any suitable type of transistor, a metal-oxide-semiconductor field-effect transistor (MOSFET) is shown including a drain contact (D) coupled to the intermediate node 44, a source contact (S) coupled to the shunt resistor 50, which is in turn coupled to ground, and a gate contact (G) coupled to an output of the operational amplifier 52. An inverting input of the operational amplifier 52 is coupled to the source contact (S) of the transistor 48, and a non-inverting input of the operational amplifier 52 is coupled to the control circuitry 42 via a control resistor 54. A control capacitor 56 may be coupled between the non-inverting input of the operational amplifier 52 and ground in some embodiments wherein the current control signal CC_S is a pulse-width modulated signal. Otherwise, the control capacitor 56 may be omitted.

In operation, the current control signal CC_S may either be provided as a pulse-width modulated signal or an analog voltage. In either case, a direct current (DC) voltage is provided at the non-inverting input of the operational amplifier 52. In an effort to equalize the voltage at the non-inverting input with that of the inverting input, the operational amplifier 52 provides a voltage at the output thereof, which generates a gate-to-source voltage across the transistor 48. This in turn causes a current to flow from the intermediate node 44 and across the shunt resistor 50. The amount of current through the transistor 48 is proportional to the current control signal CC_S. Notably, the controllable current source 40 shown in FIG. 4 is one of a nearly endless number of circuits capable of selectively shunting a portion of the photodetector current I_PD from the intermediate node 44, all of which are contemplated herein.

In some embodiments, the optional measurement resistor 38 may be removed from the ambient light sensor circuitry 34. In such a case, the controllable current source 40 continues to act as described above, however, 100% of the photodetector current I_PD is shunted to ground by the controllable current source 40. Accordingly, the current control signal CC_S may be used by itself to determine the ambient light measurement signal ALMS as long as the control circuitry 42 updated quickly enough (e.g., greater than 100 Hz, greater than 500 Hz).

As discussed above, the ambient light sensor circuitry 34 may be especially useful in outdoor lighting fixtures where it may be desirable to determine relatively small changes in light. For example, outdoor lighting fixtures participating in a SmartCast® commissioning process as designed by Cree, Inc. of Durham, N.C. In such a process, sometimes referred to as "lightcasting," lighting fixtures in a network sequentially modulate the light output thereof at 80 Hz while other lighting fixture in the network look for the modulated light via an ambient light sensor. In an outdoor environment, detecting a modulated light signal can mean detecting the difference between 10,000 foot-candles and 10,500 foot-candles, or even between 10,000 foot-candles and 10,001 foot-candles in some situations. In other words, the resolution of the ambient light sensor circuitry 34 may be a granular as 1 foot-candle, such that the ambient light sensor circuitry 34 is capable of detecting a difference in ambient light as small as 1 foot-candle over a range of 10,000 foot-candles. Due to the performance enhancements in the ambient light sensor circuitry 34 discussed above, the ambient light sensor circuitry 34 is capable of differentiating these light levels. Details of a commissioning process for a lighting network are discussed in detail in U.S. patent application Ser. No. 13/782,053, now U.S. Pat. No. 9,155,166, the contents of which are hereby incorporated by reference in their entirety.

Due to the fact that the ambient light sensor circuitry 34 may be used to detect light signals modulated at 80 Hz, and due to the fact that the ambient light sensor circuitry 34 includes a feedback loop, it may be necessary and/or desirable to reduce the likelihood of interference caused by the feedback mechanism. For example, the control circuitry 42 may be configured to sample the measurement voltage V_MS at a much higher rate than 80 Hz (e.g., 800 Hz). Alternatively, the control circuitry 42 may stop sampling the measurement voltage V_MS and changing the current control signal CC_S when it is involved in a commissioning process. For example, the control circuitry 42 may receive a message that a commissioning process is to occur, and may then update the current control signal CC_S to an appropriate value and then stop updating until the commissioning process is complete.

Figure 5:
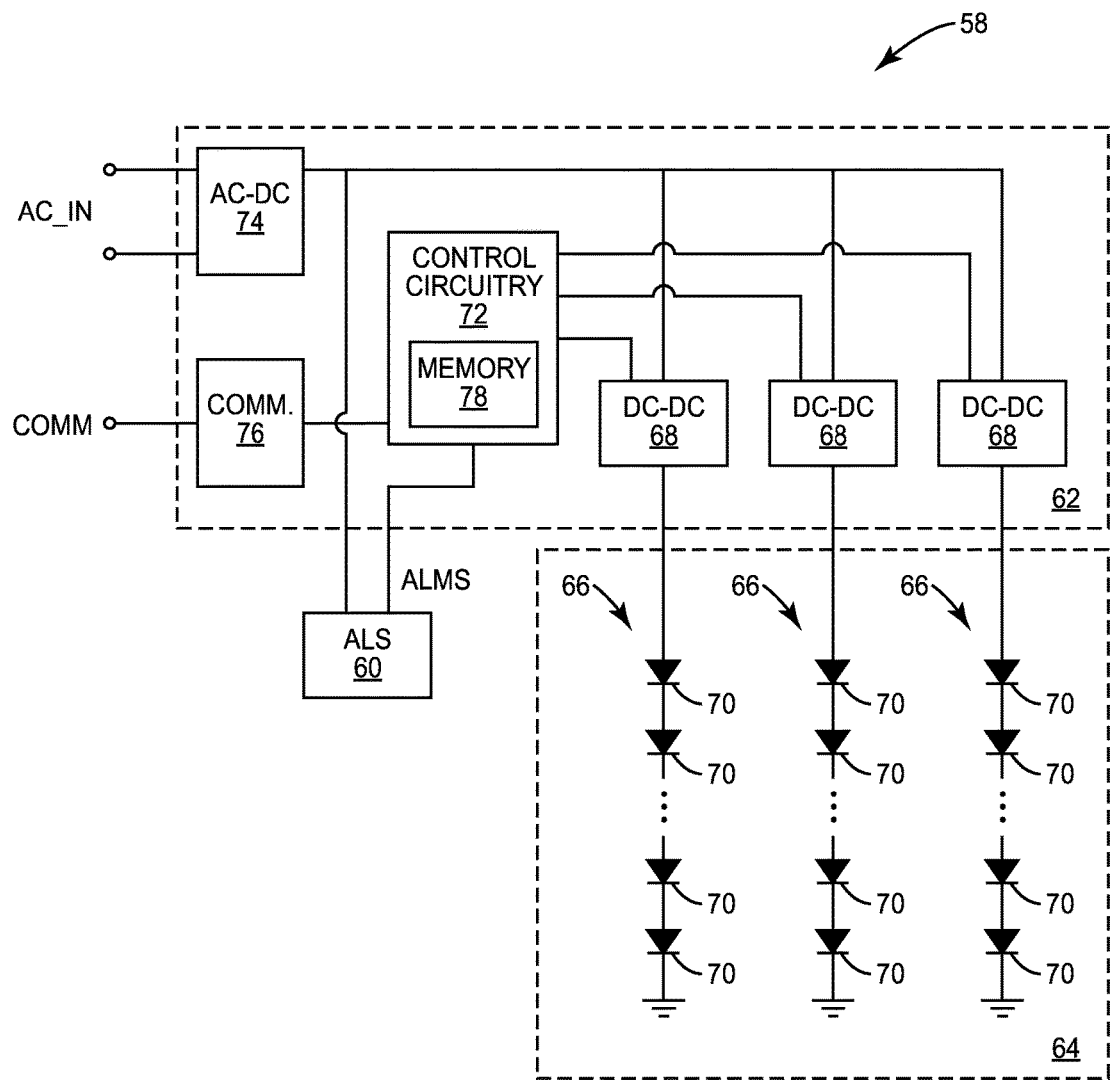
FIG. 5 is a functional schematic of a lighting fixture according to one embodiment of the present disclosure.

FIG. 5 shows a lighting fixture 58 including ambient light sensor circuitry 60 according to one embodiment of the present disclosure. The lighting fixture 58 also includes driver circuitry 62 and a light-emitting diode (LED) array 64. The LED array 64 includes a number of light-emitting diode (LED) strings 66, each including multiple LEDs 70 coupled in series. Each one of the strings of LED strings 66 are coupled between a direct-current (DC)-to-DC converter 68 in the driver circuitry 62 and ground. Driver control circuitry 72 is coupled to each one of the DC-DC converters 68, and provides a control signal to each one of the DC-DC converters 68, which in turn controls a drive current through each LED string 66. Alternating current (AC)-to-DC converter circuitry 74 is coupled between an AC input and each one of the DC-DC converters 68. The AC-to-DC converter circuitry 74 receives an AC input signal AC_IN, rectifies the signal, and provides power factor correction to the signal to provide a DC supply voltage. The DC supply voltage is used to power the DC-DC converters 68, the driver control circuitry 72, the ambient light sensor circuitry 60, and communication circuitry 76. The communication circuitry 76 may be coupled to the driver control circuitry 72 and configured to receive signals from other devices (e.g., other lighting fixtures) and provide signals to the driver control circuitry 72 to change one or more aspects of the light output from the LED array 64.

Each LED string 66 may include LEDs 70 having different characteristics. For example, each LED string 66 may primarily include LEDs 70 configured to provide light at a certain intensity or wavelength. By changing the drive current through each LED string 66, light having one or more desired characteristics, such as color, color temperature, intensity, and the like, can be achieved.

The driver control circuitry 72 includes a memory 78, which stores instructions, which, when executed by the driver control circuitry 72 implement the core functionality of the lighting fixture 58. The ambient light measurement signal ALMS is provided from the ambient light sensor circuitry 60 to the driver control circuitry 72. The driver control circuitry 72 may then use the ambient light measurement signal ALMS to adjust one or more characteristics of the light output of the LED array 64. For example, the driver control circuitry 72 may adjust a color, color temperature, intensity, color rendering index, or the like based on the ambient light measurement signal ALMS. Details regarding how the ambient light measurement signal ALMS is used by the driver control circuitry to control the light output of the LED array 64 are described in U.S. patent application Ser. No. 13/838,398, now U.S. Pat. No. 10,161,612, the contents of which are hereby incorporated by reference in their entirety.

Figure 6:
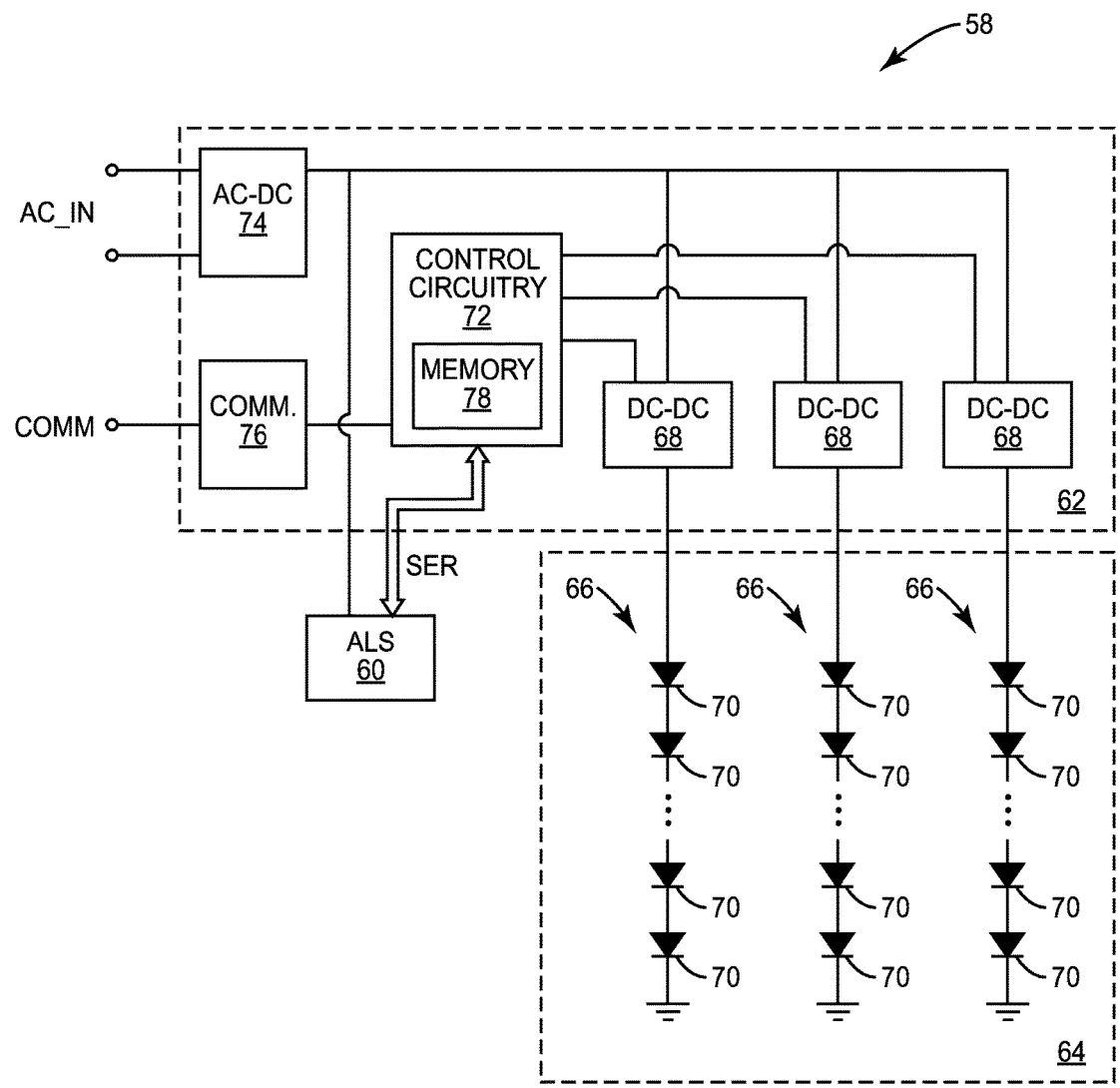
FIG. 6 is a functional schematic of a lighting fixture according to one embodiment of the present disclosure.

FIG. 6 shows the lighting fixture 58 according to an additional embodiment of the present disclosure. The lighting fixture 58 shown in FIG. 6 is substantially similar to that shown in FIG. 5, except that the ambient light sensor circuitry 60 is coupled to and communicates with the driver control circuitry 72 via a serial bus, such as an I²C serial bus or the like.

Figure 7:
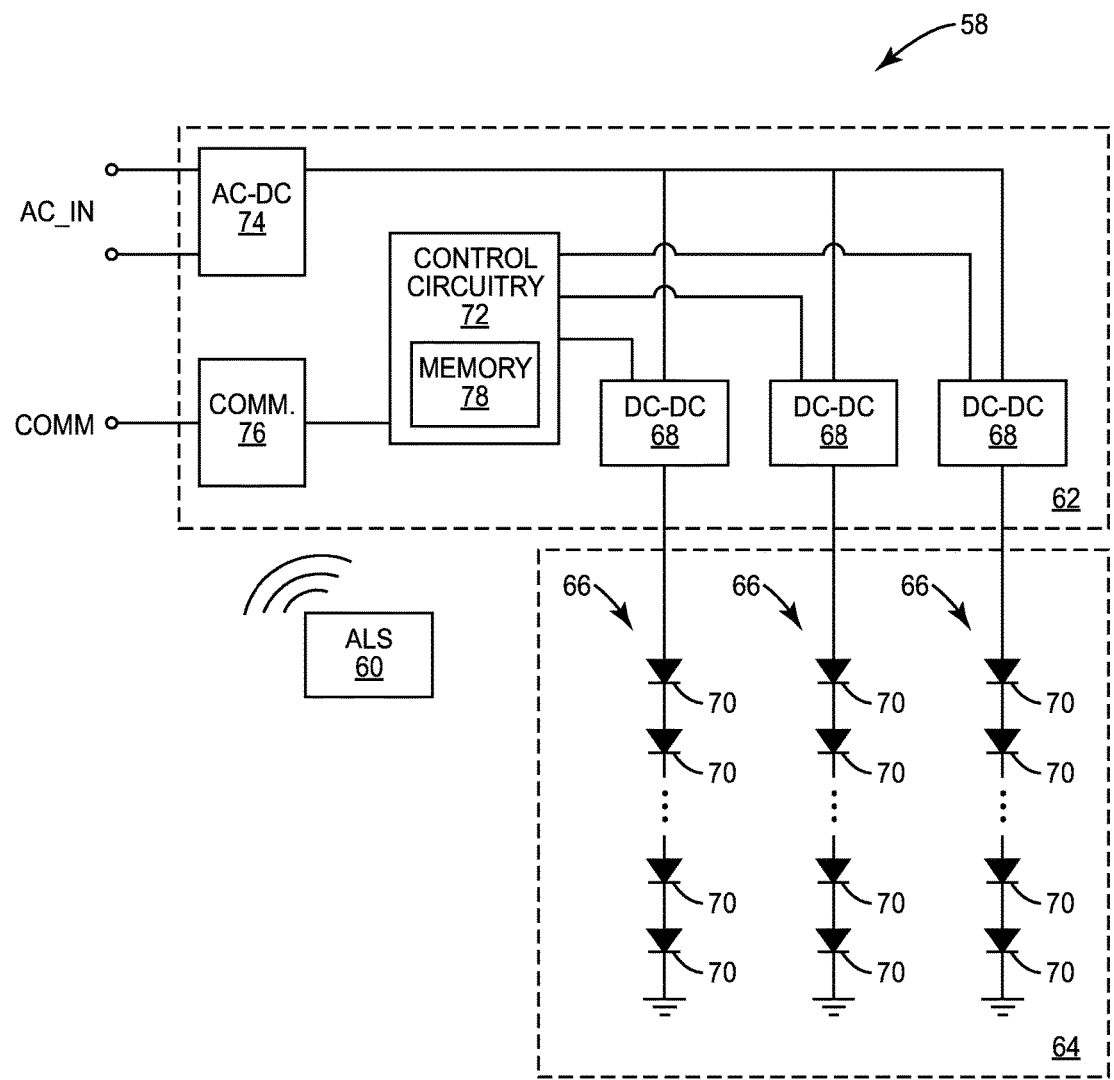
FIG. 7 is a functional schematic of a lighting fixture according to one embodiment of the present disclosure.

FIG. 7 shows the lighting fixture 58 according to an additional embodiment of the present disclosure. The lighting fixture 58 shown in FIG. 7 is substantially similar to that shown in FIGS. 5 and 6, except that the ambient light sensor circuitry 60 is provided and powered separately from the lighting fixture 58 and communicates with the lighting fixture 58 wirelessly, for example, via the communications circuitry 76.

Those skilled in the art will recognize improvements and modifications to the preferred embodiments of the present disclosure. All such improvements and modifications are considered within the scope of the concepts disclosed herein and the claims that follow.

What is claimed is:

1. Ambient light sensor circuitry comprising:
 a photodetector coupled between a supply voltage and an intermediate node such that the photodetector is directly coupled to the intermediate node, the photodetector configured to provide a photodetector current proportional to an amount of light detected thereby to the intermediate node;
 a controllable current source coupled between the intermediate node and ground and configured to shunt a portion of the photodetector current from the intermediate node to ground based on a current control signal; and
 control circuitry directly coupled to the intermediate node and coupled to the controllable current source and configured to:
  provide the current control signal to the controllable current source;
  receive a measurement signal from the intermediate node;
  adjust the current control signal such that the measurement signal does not exceed a maximum input threshold of the control circuitry; and
  calculate an ambient light measurement signal based on the measurement signal and the current control signal.

2. The ambient light sensor circuitry of claim 1 further comprising a measurement resistor coupled between the intermediate node and ground.

3. The ambient light sensor circuitry of claim 1 wherein the ambient light sensor circuitry has a range spanning 10,000 foot-candles and a resolution between 50 foot-candles and 1 foot-candle.

4. The ambient light sensor circuitry of claim 1 wherein the photodetector comprises a photodiode and amplifier.

5. The ambient light sensor circuitry of claim 1 wherein the current control signal is provided to the controllable current source such that the portion of the photodetector current shunted to ground by the controllable current source is initially set to zero.

6. The ambient light sensor circuitry of claim 1 wherein the control circuitry is further configured to convert the measurement signal to a digital value.

7. The ambient light sensor circuitry of claim 6 wherein adjusting the current control signal such that the measurement signal does not exceed the maximum input threshold of the control circuitry comprises adjusting the current control signal such that the least significant bit of the digital value is zero.

8. The ambient light sensor circuitry of claim 6 wherein adjusting the current control signal such that the measurement signal does not exceed the maximum input threshold of the control circuitry comprises adjusting the current control signal such that all bits except the most significant bit are zero.

9. A lighting fixture comprising:
 a solid-state light source configured to provide a light output based on a driver signal;
 driver circuitry configured to provide the driver signal to the solid-state light source based at least in part on an ambient light measurement signal; and
 ambient light sensor circuitry coupled to the driver circuitry and comprising:
  a photodetector directly coupled between a supply voltage and an intermediate node and configured to provide a photodetector current proportional to an amount of light detected thereby to the intermediate node;

a controllable current source directly coupled between the intermediate node and ground and configured to shunt a portion of the photodetector current from the intermediate node to ground based on a current control signal; and control circuitry directly coupled to the intermediate node and coupled to the controllable current source and configured to:

provide the current control signal to the controllable current source;

receive a measurement signal from the intermediate node;

adjust the current control signal such that the measurement signal does not exceed a maximum input threshold of the control circuitry;

calculate the ambient light measurement signal based on the measurement signal and the current control signal; and provide the ambient light measurement signal to the driver circuitry.

10. The lighting fixture of claim 9 wherein the ambient light sensor circuitry further comprises a measurement resistor coupled between the intermediate node and ground.

11. The lighting fixture of claim 9 wherein the ambient light sensor circuitry has a range spanning 10,000 foot-candles and a resolution between 50 foot-candles and 1 foot-candles.

12. The lighting fixture of claim 9 wherein the photodetector comprises a photodiode and amplifier.

13. The lighting fixture of claim 9 wherein the current control signal is provided to the controllable current source such that the portion of the photodetector current shunted to ground by the controllable current source is initially set to zero.

14. The lighting fixture of claim 9 wherein the control circuitry of the ambient light sensor circuitry is further configured to convert the measurement signal to a digital value.

15. The lighting fixture of claim 14 wherein adjusting the current control signal such that the measurement signal does not exceed the maximum input threshold of the control circuitry comprises adjusting the current control signal such that the least significant bit of the digital value is zero.

16. The lighting fixture of claim 14 wherein adjusting the current control signal such that the measurement signal does not exceed the maximum input threshold of the control circuitry comprises adjusting the current control signal such that all bits except the most significant bit are zero.

* * * * *